(12) United States Patent
Helgason et al.

(10) Patent No.: US 11,630,372 B2
(45) Date of Patent: Apr. 18, 2023

(54) OPTICAL RESONATOR FREQUENCY COMB

(71) Applicants: Oskar Bjarki Helgason, Partille (SE); Victor Torres Company, Gothenburg (SE)

(72) Inventors: Oskar Bjarki Helgason, Partille (SE); Victor Torres Company, Gothenburg (SE)

( * ) Notice: Subject to any disclaimer, the term of this patent is extended or adjusted under 35 U.S.C. 154(b) by 0 days.

(21) Appl. No.: 17/854,189

(22) Filed: Jun. 30, 2022

(65) Prior Publication Data

US 2023/0033612 A1 Feb. 2, 2023

(30) Foreign Application Priority Data

Jul. 8, 2021 (SE) ..................... 2150920-3

(51) Int. Cl.
*G02F 1/35* (2006.01)

(52) U.S. Cl.
CPC ............ *G02F 1/354* (2021.01); *G02F 1/3503* (2021.01); *G02F 2203/17* (2013.01); *G02F 2203/50* (2013.01); *G02F 2203/56* (2013.01)

(58) Field of Classification Search
CPC .... G02F 1/3503; G02F 1/354; G02F 2203/17; G02F 2203/50; G02F 2203/56
See application file for complete search history.

(56) References Cited

U.S. PATENT DOCUMENTS

| | | | |
|---|---|---|---|
| 7,982,944 B2 | 7/2011 | Kippenberg et al. | |
| 9,348,194 B2 | 5/2016 | Herr et al. | |
| 9,891,500 B1 | 2/2018 | Chu et al. | |
| 10,451,806 B1 | 10/2019 | Puckett et al. | |
| 10,466,418 B2 * | 11/2019 | Fanto | G02F 1/225 |

(Continued)

FOREIGN PATENT DOCUMENTS

| | | |
|---|---|---|
| CN | 107863676 A | 3/2018 |
| CN | 109119882 A | 1/2019 |

(Continued)

OTHER PUBLICATIONS

Helgason et al., "Dissipative solitons in photonic molecules," Nature Photonics, Nature Research, 15, 305-310. (2021).

(Continued)

*Primary Examiner* — Daniel Petkovsek
(74) *Attorney, Agent, or Firm* — McDonald Hopkins LLC

(57) ABSTRACT

An optical resonator frequency comb comprising a main optical resonator being made of a resonator material, which has a third order nonlinearity and an anomalous resonator dispersion; a continuous wave (cw) laser configured for supplying continuous laser light into an optical waveguide, which is coupled with the main optical resonator. The cw laser, the optical waveguide and the main optical resonator are arranged for resonantly coupling the cw laser light into the main optical resonator for forming a single dissipative soliton circulating in the main optical resonator corresponding to the generation of a frequency comb. Furthermore, the optical resonator frequency comb further comprises an auxiliary optical element configured to induce a phase shift to a (Continued)

frequency comb component at the cw laser frequency to enhance the conversion efficiency of a generated frequency comb. The disclosure also relates to an associated method.

20 Claims, 8 Drawing Sheets

(56) References Cited

U.S. PATENT DOCUMENTS

| | | | |
|---|---|---|---|
| 10,615,566 B2 | 4/2020 | Weiner et al. | |
| 11,175,563 B2* | 11/2021 | Wong | G02F 1/365 |
| 2007/0076282 A1* | 4/2007 | Kourogi | G02F 1/0311 |
| | | | 359/237 |
| 2012/0105177 A1 | 5/2012 | McLaren et al. | |
| 2015/0380900 A1 | 12/2015 | Liang | |
| 2016/0011489 A1 | 1/2016 | Herr et al. | |
| 2016/0134078 A1 | 5/2016 | Gaeta et al. | |
| 2017/0229837 A1 | 8/2017 | Cao et al. | |
| 2018/0083599 A1* | 3/2018 | Kippenberg | H03H 9/462 |
| 2018/0196198 A1 | 7/2018 | Casale et al. | |
| 2018/0205463 A1 | 7/2018 | Karpov et al. | |
| 2018/0307118 A1* | 10/2018 | Sciancalepore | G02F 1/395 |
| 2019/0296512 A1 | 9/2019 | Wong et al. | |
| 2019/0312402 A1 | 10/2019 | Lucas et al. | |
| 2019/0317379 A1 | 10/2019 | Herr et al. | |
| 2020/0201138 A1 | 6/2020 | Lin et al. | |
| 2020/0401013 A1 | 12/2020 | Liao et al. | |
| 2021/0096444 A1 | 4/2021 | Zhang et al. | |
| 2021/0242654 A1 | 8/2021 | Tang et al. | |
| 2021/0294180 A1 | 9/2021 | Kuse et al. | |

FOREIGN PATENT DOCUMENTS

| | | | |
|---|---|---|---|
| CN | 111585158 A | 8/2020 | |
| CN | 111610682 A | 9/2020 | |
| CN | 113410743 A | 9/2021 | |
| EP | 1988425 B1 | 7/2014 | |
| EP | 2962156 B1 | 1/2016 | |
| WO | 2020057716 A1 | 3/2020 | |
| WO | 2020097241 A1 | 5/2020 | |
| WO | 2020167968 A1 | 8/2020 | |
| WO | WO-2020219433 A1 * | 10/2020 | G02B 6/02214 |

OTHER PUBLICATIONS

Xue et al., "Super-efficient temporal solitons in mutually coupled optical cavities," Nature Photonics, Nature Publishing Group UK. (2019).

Herr et al., "Temporal solitons in optical microresonators," Nature Photonics, Nature Publishing Group UK. (2014).

Search report dated Mar. 8, 2022; Swedish Patent Application No. 2150920-3 filed Jul. 8, 2021.

Ye et al., "High-Q Si3N4 microresonators based on a subtractive processing for Kerr nonlinear optics," Opt. Express, 27, 25719 (2019).

Tikan et al., "Emergent nonlinear phenomena in a driven dissipative photonic dimer," Institute of Physics, China, 2020.

* cited by examiner

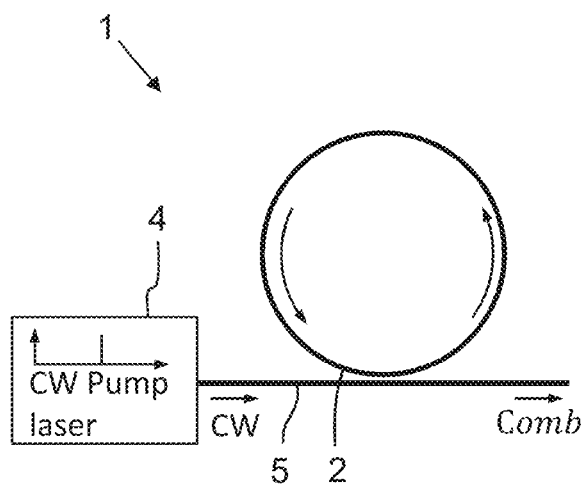
FIG.1A
Prior Art
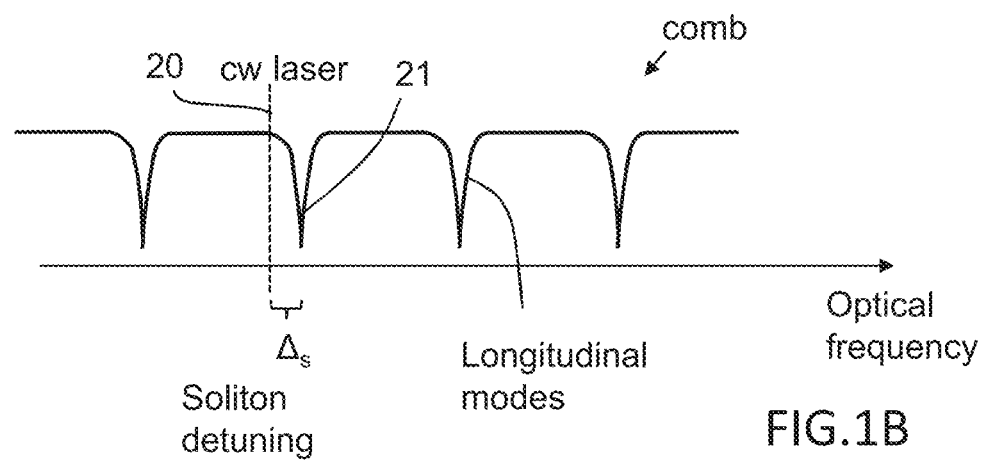
FIG.1B
Prior Art
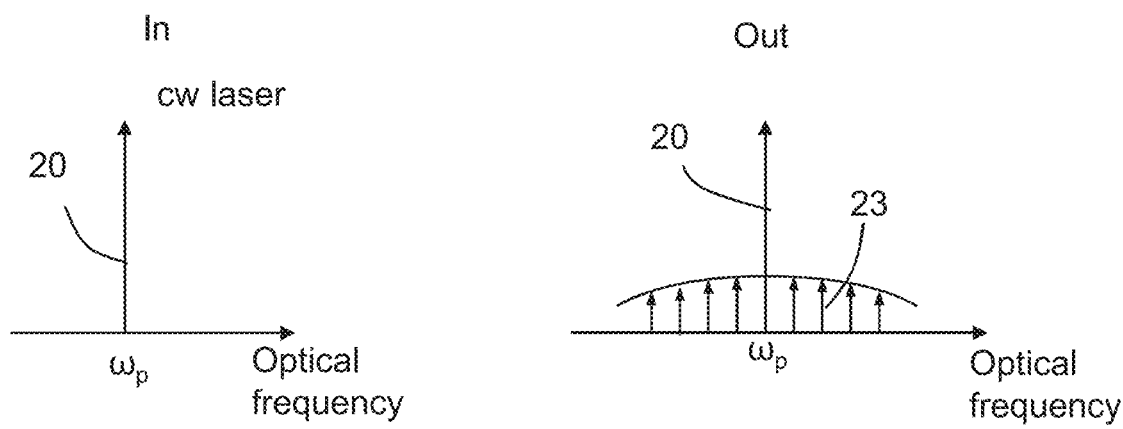
FIG.1C  Prior Art
FIG.1D  Prior Art

OPTICAL RESONATOR FREQUENCY COMB

CROSS-REFERENCE TO RELATED APPLICATION

The present application claims priority to and the benefit of Swedish Patent Application No. 2150920-3 filed on Jul. 8, 2021, entitled "AN OPTICAL RESONATOR FREQUENCY COMB," which is incorporated herein in its entirety by reference.

TECHNICAL FIELD

The present disclosure relates to optical resonator frequency comb having a high power conversion efficiency.

BACKGROUND

In the technical field of optical resonator frequency combs, dissipative Kerr solitons (DKSs) in high-Q Kerr-nonlinear resonators have attracted immense attention over the last years. Driven by a continuous wave (CW) laser, DKSs are maintained through a balance between optical losses and parametric gain. If this balance is maintained, the solitary waveforms can circulate in the resonator indefinitely without changing shape. As a result, a train of optical pulses are coupled out of the resonator, which corresponds to a coherent optical frequency comb. Such soliton microcombs present new opportunities for several applications, such as telecommunications, lidar, optical clocks, frequency synthesis, microwave photonics, spectroscopy and more.

The bulk of microcomb DKS studies have so far been conducted using a single anomalous dispersion resonator. Such cavities can generate a hyperbolic-secant DKS, whose coherence and robustness has been proven by multiple demonstrations. However, one of the main drawbacks of these waveforms is their limited conversion efficiency.

A few solutions have been suggested to circumvent this limited conversion efficiency. One approach is to employ normal dispersion microcavites, which offer much higher conversion efficiency. However, DKS's generated in the anomalous dispersion regime have remained with low conversion efficiency.

SUMMARY

An object of the present disclosure is to provide an optical resonator frequency comb and associated methods for operating and initiating such a comb, where the previously mentioned problems are avoided. This object is at least partly achieved by the features of the independent claims. The dependent claims contain further developments of the optical resonator frequency comb and associated methods.

According to a first aspect of the present disclosure, there is provided an optical resonator frequency comb, comprising: a main optical resonator being made of a resonator material, which has a third order nonlinearity and an anomalous resonator dispersion; a continuous wave (cw) laser configured for supplying continuous laser light into an optical waveguide, which is coupled with the main optical resonator; wherein the cw laser, the optical waveguide and the main optical resonator are arranged for resonantly coupling the cw laser light into the main optical resonator for forming a single dissipative soliton circulating in the main optical resonator corresponding to the generation of a frequency comb; wherein the optical resonator frequency comb further comprises an auxiliary optical element configured to induce a phase shift to a frequency comb component at the cw laser frequency to enhance the conversion efficiency of a generated frequency comb. Stated differently, the auxiliary optical element may be configured to induce a frequency shift to a longitudinal frequency mode of the main optical resonator associated with the cw laser frequency, thereby enhancing the conversion efficiency of a generated frequency comb.

According to a second aspect of the present disclosure, there is provided a method for operating an optical resonator frequency comb. The method comprises: providing a continuous wave (cw) laser, a main optical resonator being made of a resonator material having a third order nonlinearity and an anomalous resonator dispersion, and an auxiliary optical element; and feeding cw laser light from the cw laser into an optical waveguide, which is coupled with the main optical resonator and forming a single dissipative soliton circulating in the main optical resonator corresponding to the generation of a frequency comb, while the auxiliary optical element induces a phase shift to a frequency comb component at the cw laser frequency to enhance the conversion efficiency of a generated frequency comb. Stated differently, the auxiliary optical element induces a frequency shift to a longitudinal frequency mode of the main optical resonator associated with the cw laser frequency, thereby enhancing the conversion efficiency of a generated frequency comb.

According to a third aspect of the present disclosure, there is provided a method for initiating an optical resonator frequency comb having a continuous wave (cw) laser, a main optical resonator being made of a resonator material having a third order nonlinearity and an anomalous resonator dispersion, an auxiliary optical element in form of an auxiliary resonator, and an auxiliary heater for tuning of a resonance frequency of the auxiliary resonator. The method comprises: feeding cw laser light into an optical waveguide using the cw laser and controlling operation of the auxiliary heater for providing a multi-soliton comb in the main optical resonator; tuning the cw laser and the auxiliary heater for reducing the number of solitons until a single dissipative soliton circulates in the main optical resonator corresponding to the generation of a frequency comb; increasing the power of the auxiliary heater for inducing a phase shift to a frequency comb component at the cw laser frequency to enhance the conversion efficiency of a generated frequency comb; and thereafter attenuating the power of the cw laser light. Stated differently, the method comprises increasing the power of the auxiliary heater for inducing a frequency shift to a longitudinal frequency mode of the main optical resonator, the longitudinal frequency mode being associated with the cw laser frequency, and thereby enhancing the conversion efficiency of a generated frequency comb and thereafter attenuating the power of the cw laser light.

One of the main causes why DKS's generated in the anomalous dispersion have low conversion efficiency is that they require the CW pump laser frequency to be effectively detuned far to the red side of resonance, resulting in much of the CW power bypassing the resonator. Specifically, while the comb power tends to increase as the pump is tuned more towards red, the CW level will decrease in the resonator, to the point where it can no longer maintain the DKS.

The solution according to the disclosure provides a solution to this problem by introducing a phase shift of a longitudinal mode associated with the cw laser frequency. The phase shift enables the cw laser to operate more close to a resonance frequency of the main resonator, i.e. enabling the pump to be effectively detuned closer to resonance center, thereby improving the coupling efficacy between the cw laser and main resonator.

Experiments with a single DKS show conversion efficiency of >50%. Such high conversion efficiency is especially appealing for optical telecommunications. Furthermore, this photonic molecule design can introduce other useful dynamics, e.g. with regards to soliton initiation and stability, that deserve thorough investigations in the future.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF DRAWINGS

The optical frequency comb according to the disclosure will be described in detail in the following, with reference to the attached drawings, in which FIG. 1A-D show prior art solution, FIG. 6A-6C shows measured and simulated spectrum coupled from the main resonator.

DESCRIPTION OF EXAMPLE EMBODIMENTS

Figure 2A:
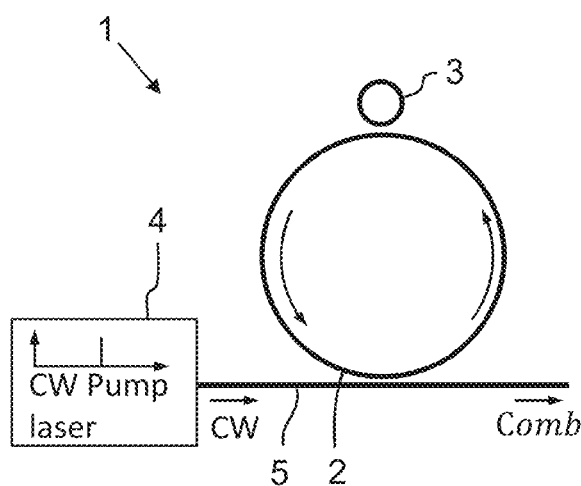
FIG. 2A-D show an example embodiment of the new design with mode phase shift.

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

With reference to FIGS. 2A and 3A-G, an optical resonator frequency comb 1 with higher than 50% comb power conversion efficiency is disclosed. The resonator frequency comb 1 originates from a dissipative Kerr soliton (DKS) circulating in linearly-coupled anomalous-dispersion resonator 2.

An optical resonator is an optical cavity that presents a set of longitudinal modes or resonances. The resonator is made of an anomalous dispersion waveguide so that it can support the formation of a temporal soliton.

FIG. 1A schematically shows a prior art design of the optical frequency comb 1, which includes a continuous wave (CW) laser source 4 supplying continuous laser light to an optical waveguide 5 that extends past and in close vicinity of a single unperturbed main optical resonator 2. The main optical resonator 2, which is also known as resonator cavity, or simply cavity, is made of third-order (Kerr) nonlinear material and is arranged for being linearly coupled to the optical waveguide 5 when laser light is supplied from the laser to the optical waveguide 5 for formation of dissipative solitons (DKSs) in the main resonator and for generating a frequency comb that is supplied at the end of the optical waveguide 5.

Optical resonators are microscale or millimetre scale cavities that confine light by resonant recirculation. They may have a size of for example tenth to hundreds micrometres in their main direction of extension, such as diameter, or being even larger, such as up in the millimetre range. The resonators can be arranged in coupled arrays, with the dimensions of the unit cell precisely engineered, for example by means of lithography. Small-volume optical resonators with high quality (Q) factors enables large build-up of the intracavity intensity using low-power continuous-wave (c.w.) lasers. For example, formation of a dissipative soliton (DKS), which is a self-enforcing solitary wave in nonlinear dissipative systems subject to an external energy supply, is possible. DKS may exist in resonators with normal as well as anomalous dispersion and exhibit a rich diversity of soliton dynamics. In the time domain, a DKS corresponds to a localized waveform circulating at a rate commensurate to the cavity free spectral range (FSR).

One problem with the prior art type of combs is the relatively low comb power conversion efficiency, i.e. ratio of power of the components of the comb being generated by the frequency comb and power being inputted by the cw laser 4 into the optical waveguide 5.

With reference to FIG. 1B, a single ideal (unperturbed) resonator displays a set of longitudinal modes (resonant optical frequencies). When the resonator is designed with anomalous dispersion, the relative distance between consecutive modes increases with optical frequency (that is, blue components travel faster than red ones). In this case, the optical resonator can generate an optical soliton when subject to a continuous-wave laser tuned closely to one of the longitudinal modes (see for example Herr et al. Nature Photonics 8, 145 (2014). The problem is that the CW laser cannot be on resonance with one of the longitudinal modes because it must be red-detuned from the longitudinal mode that it pumps for the soliton to exist, as schematically illustrated in FIG. 1B, which shows the laser frequency 20 being offset from an adjacent longitudinal mode 21.

This offset, also referred to as soliton detuning, results into inefficient coupling of CW power into the resonance when the soliton exists in the resonator (see Xue et al. Laser & Photonic Reviews 11, 1600276 (2017)). As a result, the power conversion efficiency of soliton microcombs is low, typically —1%.

This relatively low power conversion efficiency is described with reference to schematically illustrated FIGS. 1C-D, wherein FIG. 1C shows the input to the main resonator 2 in form of a cw laser light having a certain frequency $\omega_p$ being supplied by the cw laser 4 to the optical waveguide 5, and FIG. 1D shows the output of the main resonator 2 in form of a comb 23 having a plurality of components with relatively low amplitude1, superposed with a portion of the input cw laser light.

The present disclosure provides a solution to this problem by providing the resonator with a physical perturbation that results in a frequency shift of one or more of the longitudinal modes with respect to the frequency location in absence of coupling. The perturbation is such that the induced frequency shift compensates partially the inherent pump frequency detuning when the soliton would be formed in the unperturbed cavity. The perturbation thus results into a more efficient coupling of the CW laser light into the resonator when the soliton is generated into the main cavity. The overall power conversion efficiency (extracted comb power excluding the pump/input pump power) may be higher than 10%. Thus, aspects and embodiments of the present disclosure provide an optical resonator frequency comb comprising a main optical resonator being made of a resonator material, which has a third order nonlinearity and an anomalous resonator dispersion, and a continuous wave (cw) laser configured for supplying continuous laser light into an optical waveguide, which is coupled with the main optical resonator. The cw laser, the optical waveguide and the main optical resonator may be arranged for resonantly coupling the cw laser light into the main optical resonator for forming a single dissipative soliton circulating in the main optical resonator corresponding to the generation of a frequency comb. The optical resonator frequency comb may further comprise an auxiliary optical element configured to induce a frequency shift to a longitudinal frequency mode of the main optical resonator associated with the cw laser frequency, thereby enhancing the conversion efficiency of a generated frequency comb. Thus, the solution of the present disclosure could induce the desired frequency shift onto at least one longitudinal mode of the main optical resonator, the longitudinal mode being associated with the cw laser frequency. The frequency shift enables the cw laser to operate more close to a resonance frequency of the main resonator, i.e. enabling the pump to be effectively detuned closer to resonance center, thereby improving the coupling efficacy between the cw laser and main resonator. In other words, the CW pump power can be more efficiently coupled into the resonator while the soliton is generated into the cavity, because the frequency of the CW laser can be located closer to the frequency of the frequency-shifted longitudinal mode in the perturbed cavity. This way the advantageous effect of enhanced power conversion efficiency can be achieved according to the present disclosure.

FIG. 2A-D schematically shows an example embodiment of the optical resonator frequency comb having a perturbation causing the desired frequency shift of a longitudinal mode, such that resulting longitudinal mode is more aligned with the cw laser frequency.

Figure 2B:
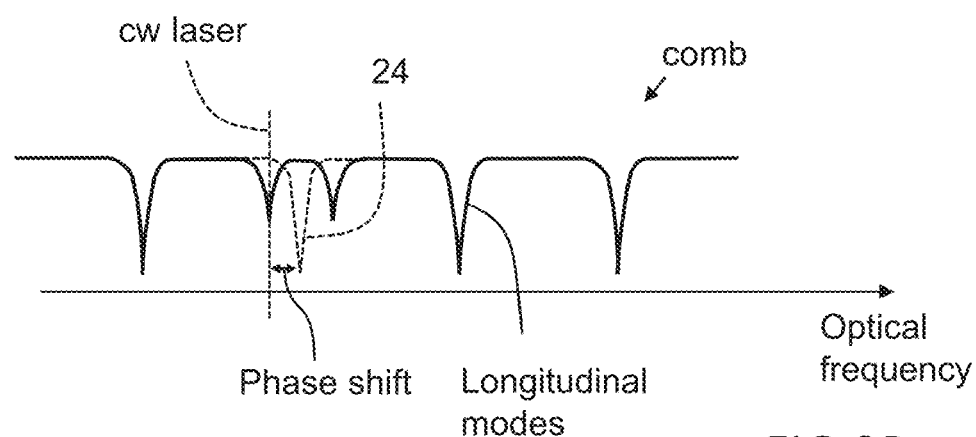

Specifically, FIG. 2A shows a main microresonator cavity 2 having anomalous dispersion and hence being in principle susceptible to generate a single soliton when subject to CW laser light. A physical perturbation of the main resonator cavity is here induced by means of an auxiliary resonator 3, such that at least one mode, of the plurality of longitudinal modes, is affected, i.e. phase shifted, as schematically illustrated in FIG. 2B. The split of the longitudinal mode 21 into two neighbouring modes is sometimes referred to as modesplitting. The perturbation induces a frequency shift on the natural location 24 of the mode. In this way, the CW pump power can be more efficiently coupled into the resonator while the soliton is generated into the cavity, because the frequency of the CW laser can be located closer to the frequency of the phase shifted longitudinal mode in the perturbed cavity. As a result, the power of the CW laser is more efficiently coupled into the resonance while the soliton is formed. Hence, the power conversion efficiency of >10% can be attained.

Figures 2C, 2D:
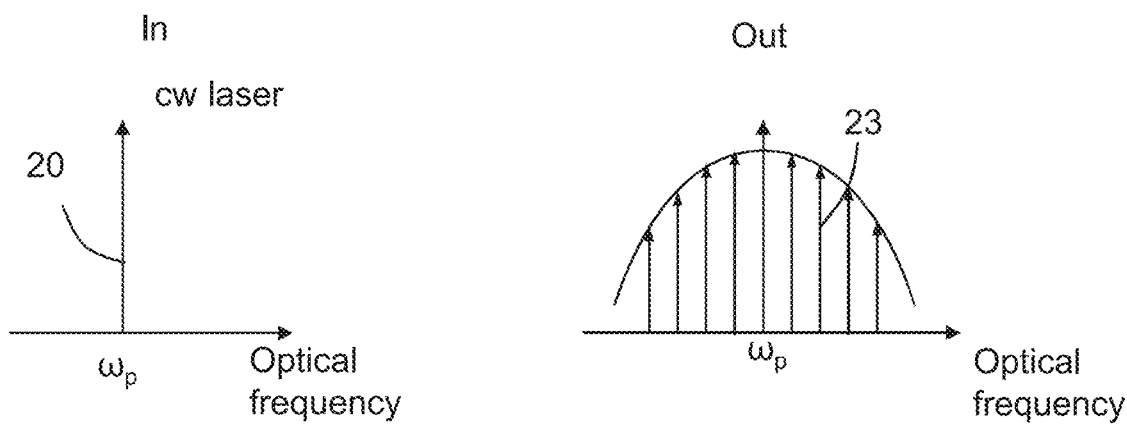

This improved comb power conversion efficiency is illustrated with reference to FIGS. 2C-D, wherein FIG. 2C shows the input to the main resonator 2 in form of a cw laser light having a certain frequency $\omega_p$ being supplied by the cw laser 4 to the optical waveguide 5, identical with FIG. 1C. Furthermore, FIG. 2D shows the output of the main resonator 2 in form of a comb 23 having a plurality of components with relatively high amplitude 23, compared with the superposed portion of the input cw laser light. The large amplitude of the comb components in FIG. 2D compared with the relatively small amplitude of the comb components in FIG. 1D show the improvement in terms of power conversion efficiency provided by means of the basic concept underlying the solution disclosed in the present disclosure.

The perturbation can be attained by many different means, e.g. by using an auxiliary resonator with dissimilar free spectral ranges (FSRs), as illustrated in FIGS. 1A and 2A. Some, but not all, such as for example about 1-30, specifically 1-5, or more specifically a single, longitudinal modes in the absence of coupling would be degenerate in frequency. When the main and auxiliary resonators 2, 3 are placed in close proximity to each other, the mode frequencies that are degenerate will experience coupling and will introduce a doublet. This results in a frequency shift corresponding to the coupling rate between the resonators 2, 3.

Figure 3A:
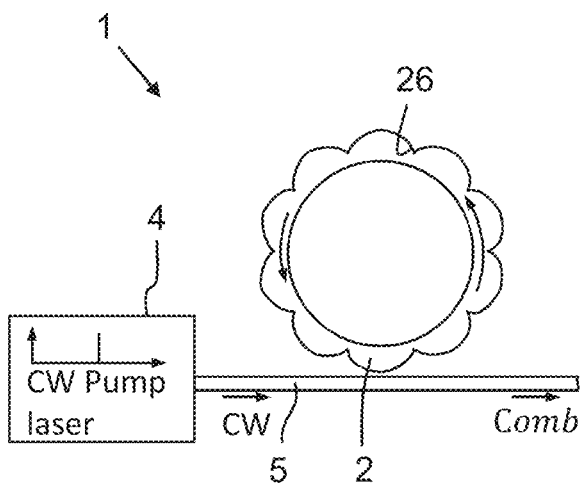
FIG. 3A-G show various alternative embodiments for generating the desired phase shift.

Alternatively, as schematically illustrated in FIG. 3A, the comb may include a single resonator 2 having a grating 26 inscribed along the wall of the resonator 2 for coupling of two counterpropagating transverse modes in the resonator 2. This will induce a doublet along the longitudinal mode defined by the grating period. The strength of the coupling can be controlled by the amplitude of the grating.

Figure 3B:
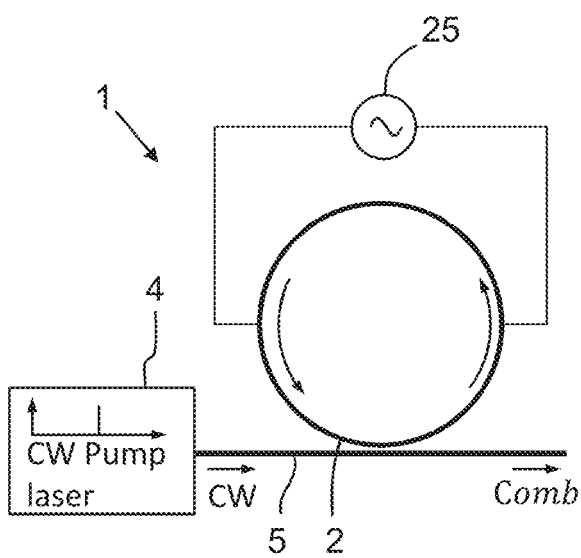

Still more alternatively, as schematically illustrated in FIG. 3B, the resonator 2 may be subject to an external electromagnetic control field. This electromagnetic field could be optical (in virtue of a nonlinear effect via second or third-order nonlinear susceptibility) or radio-frequency if the resonator is made of an electro-optic material. In FIG. 3B, an electric power source 25 is connected to the main resonator 2 for generating an external electromagnetic control field that may be configured for perturbing at least one longitudinal mode of the main resonator 2.

Other means for accomplishing a perturbation of at least the mode associated with the cw laser may be to induce active modulation with an external RF control signal, such as for example by means of thermal, phononic or acousto-optic modulation. The point is that the external RF field could induce the desired frequency shift onto at least one longitudinal mode.

Generating a perturbation of a longitudinal mode by means of an auxiliary resonator, as described above with reference to FIGS. 2A-D, is described more in detail below with reference to FIGS. 3C-3G.

Specifically, the microcomb 1 and methods for operating or initiating a microcomb according to disclosure involves may use of a photonic molecule, i.e. two linearly coupled resonators 2, 3, to vastly improve the conversion efficiency of a DKS generated in a main optical resonator 2 having anomalous dispersion.

Figure 3C:
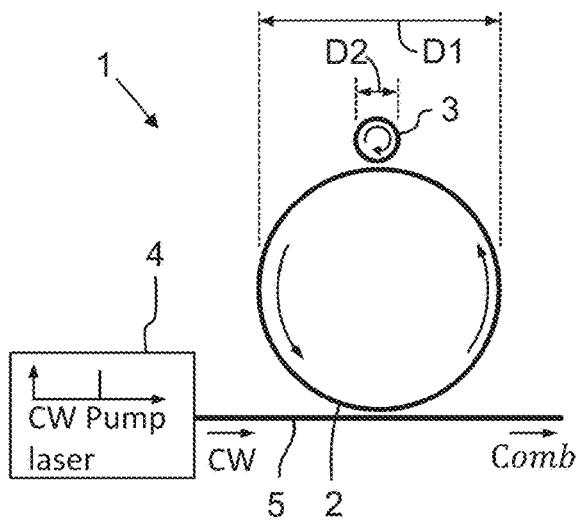

FIG. 3C schematically shows a first example embodiment of the microcomb 1, having a main optical resonator 2 made of Kerr-nonlinear material placed in close proximity to an auxiliary resonator 3 made of normal dispersion and anomalous dispersion material and arranged for being linearly coupled to the auxiliary resonator 3 when CW laser light is supplied to the main resonator 2 from a continuous wave (CW) laser source 4 via an optical waveguide 5 that extends past and in close vicinity of the main resonator 2.

Each of the main and auxiliary resonators 2, 3 may be formed by an annular waveguide made of a material suitable for confining light circulating in the waveguide ring. Dispersion herein refers to group velocity dispersion of the waveguide.

By placing the main and auxiliary microresonators 2, 3 in close proximity, the evanescent field of one cavity serves as a perturbation to the field in the adjacent one, resulting in linear coupling. The coupling lifts the frequency degeneracy and manifests in the emergence of a doublet of two new eigenfrequencies, corresponding to the eigenvalues of the supermodes. This arrangement of two microresonators placed in close proximity is often called a 'photonic molecule'. The photonic molecule offers the flexibility of tuning the frequency offset via the thermo-optic effect by placing a heater on top of one of the main and auxiliary microresonators 2, 3. This in turn permits continuous tuning of the location of the degeneracy point and hence the frequency separation of the doublet.

When in operation, the main resonator 2 produces a DKS when one of its resonance, i.e. one of its longitudinal modes, is pumped with a CW laser 4. The auxiliary resonator 3 may be tuned to induce a phase shift to the pump frequency (i.e. via mode-splitting) such that it has an effective detuning close to resonance centre. In other words, the auxiliary resonator may be configured to be tuned to induce a frequency shift to the longitudinal frequency mode of the main optical resonator, the longitudinal frequency mode being associated with the cw laser frequency, such that it has an effective detuning close to resonance centre. This way, the CW laser light is coupled more efficiently to the main resonator 2, resulting in enhanced power conversion efficiency, as described above.

The phase shift of the pumped longitudinal mode of the comb 1 is not required for other comb frequencies. Consequently, modal interaction at other frequencies, i.e. at frequencies different from the pump frequency, may be reduced or even minimized by employing an auxiliary resonator with relatively large resonance separation, i.e. a large free spectral range (FSR). The FSR of a resonator depends on for example the size of the resonator and the resonator material of the waveguide of the resonator. Hence, by for example using a relatively small size auxiliary resonator 3 that inherently has a relatively large FSR, the modal interaction between the main and auxiliary resonators 2, 3 may be reduced, thereby enabling further improvement in comb conversion efficiency.

In the example embodiment depicted in FIG. 3C, the diameter D1 of the main resonator 2 may be about nine times larger than the diameter D2 of the auxiliary resonator 3, for accomplishing a low level of modal interaction.

Figure 3D:
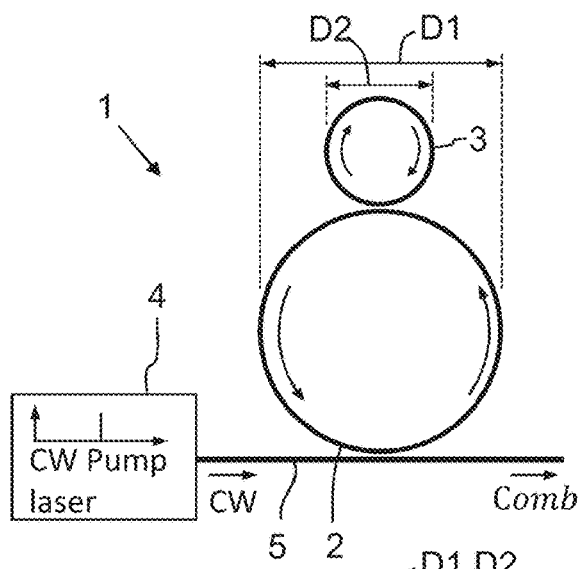

In the example embodiment depicted in FIG. 3D, the diameter D1 of the main resonator 2 may be about twice the size of the diameter D2 of the auxiliary resonator 3, thereby still accomplishing an improved conversion efficiency compared with the prior art designs.

Figure 3E:
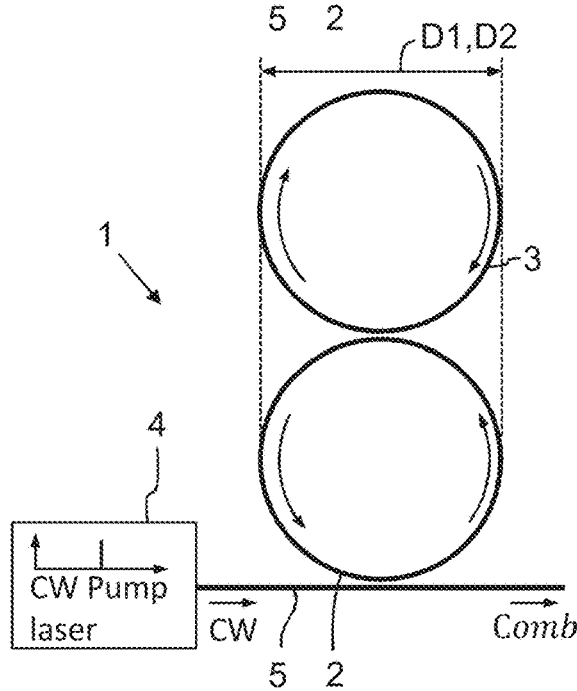

In the example embodiment depicted in FIG. 3E, the diameter D1 of the main resonator 2 may be substantially equal to the diameter D2 of the auxiliary resonator 3, but the FSR of the auxiliary resonator may still be significantly larger, for example at least twice at large, than the FSR of the main resonator, be appropriate selection of waveguide material of the first and second resonators, thereby still accomplishing an improved conversion efficiency compared with the prior art designs.

In other words, the present disclosure describes an optical resonator frequency comb, comprising: a main optical resonator being made of a resonator material, which has a third order nonlinearity and an anomalous resonator dispersion; a continuous wave (cw) laser configured for supplying continuous laser light into an optical waveguide, which is coupled with the main optical resonator; wherein the cw laser, the optical waveguide and the main optical resonator are arranged for resonantly coupling the cw laser light into the main optical resonator for forming a single dissipative soliton circulating in the main optical resonator corresponding to the generation of a frequency comb; wherein the optical resonator frequency comb further comprises an auxiliary optical element configured to induce a frequency shift to a longitudinal frequency mode of the main optical resonator associated with the cw laser frequency to enhance the conversion efficiency of a generated frequency comb.

For ensuring a relatively high power conversion efficiency, modal interaction may be kept within reasonable limits. For example, the auxiliary optical element may be configured to induce a frequency shift to only a limited portion of all longitudinal frequency modes of the main optical resonator.

Alternatively, the auxiliary optical element may be configured to induce a frequency shift to at least one, but not all, longitudinal modes of the main resonator.

Still more alternatively, the auxiliary optical element may be configured to induce a frequency shift to not more than 30, specifically not more than 10, and more specifically not more than 3 longitudinal modes of the main resonator Alternatively, for ensuring an even higher comb conversion efficiency, modal interaction may be minimized. This may be accomplished by having the auxiliary optical element configured to induce a frequency shift to only one longitudinal mode of the main resonator.

In some example embodiments, the main optical resonator has a first free spectral range (FSR), the auxiliary optical element is an auxiliary optical resonator having a second free spectral range (FSR) and being positioned adjacent to the main optical resonator for being linearly coupled with the main optical resonator during operation of the optical resonator frequency comb, wherein the second free spectral range is at least three times larger, specifically at least six times larger, and more specifically at least nine times larger, than the first free spectral range. Thereby, modal interaction between the main and auxiliary resonators may be reduced.

FIGS. 3C-D show frequency combs with different sized auxiliary resonators 3 but same sized main resonators 2, thereby reflecting different levels of modal interaction between the modes of the main and auxiliary resonators 2, 3. In other words, in some example embodiments, the auxiliary optical element is an auxiliary optical resonator being positioned adjacent to the main optical resonator for being linearly coupled with the main optical resonator during operation of the optical resonator frequency comb, wherein the main optical resonator has an annular form with a first diameter and an auxiliary optical resonator has an annular form with a second diameter, wherein the first diameter is at least three times larger, specifically at least six times larger, and more specifically at least nine times larger, than the second diameter. A smaller size auxiliary resonator compared with the main resonator provides reduced modal interaction and thus improved comb conversion efficiency.

As described above, the main and auxiliary resonators 2, 3 may be placed in close proximity to each other, such that an evanescent field of the auxiliary resonator 3 serves as a perturbation to an evanescent field of the main resonator 2, thereby enabling linear coupling between the main and auxiliary resonators 2, 3 during operation of the optical resonator frequency comb 1. For example, a gap distance between the waveguide of the main resonator 2 and the waveguide of the auxiliary microresonator 3 may be about 500 nanometre [nm].

The main and auxiliary resonators 2, 3 may be configured for having a mutual linear coupling during operation of the optical resonator frequency comb, such that the cw laser light that is being fed into the optical waveguide 5 is resonant in both the main and auxiliary resonators 2, 3.

The auxiliary optical resonator 3 may be made of a resonator material, which has a third order nonlinearity and an anomalous resonator dispersion. Alternatively, the auxiliary optical resonator 3 may be made of a resonator material having a normal resonator dispersion.

As illustrated in FIGS. 3A-G, the frequency comb includes a single continuous wave (cw) laser for powering the main resonator with laser light. In other words, the laser light being supplied to, and coupled with, the main resonator includes a single frequency.

Figure 3F:
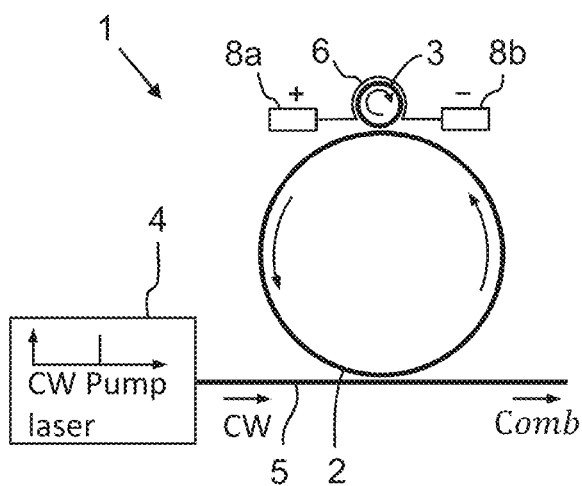

FIG. 3F shows a comb similar to that of FIG. 3C, but with addition of an auxiliary heater 6 for enabling heating of the auxiliary resonator 3. The auxiliary heater 6 is used for tuning the resonance frequency of the auxiliary resonator 3. Consequently, by means of the auxiliary heater 6, the auxiliary resonator 3 may be tuned to induce the desired phase shift of a longitudinal mode of the main resonator 2. The thermal auxiliary heater 6 may for example be made of Au may be fabricated on top of the auxiliary microresonator for thermal tuning thereof. Specifically, thermal tuning may be accomplished by applying a voltage over the auxiliary heater via positive and negative terminals 8a, 8b, such that a current starts flowing there through and generating heat, as a resistive heater.

By means of the auxiliary heater 6, the auxiliary resonator 3 may be configured to be tuned to induce a phase shift to the pump frequency such that it has an effective detuning close to resonance centre.

Figure 3G:
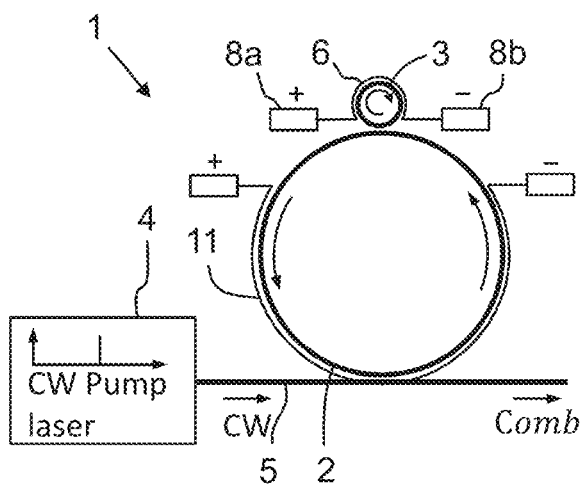

With reference to FIG. 3G, each of the main and auxiliary resonators 2, 3 may be provided with a separate heater 6, 11 (auxiliary heater 6 and main heater 11) for enabling individual and separate tuning of the resonance frequency of main and auxiliary resonators 2, 3. This setup provides even better and more flexible tuning of the micrcomb. Furthermore, the setup of any embodiment shown with reference to FIGS. 2A-3F may of course alternatively be combined with an add-drop configuration, instead of the illustrated add-through configuration.

Figure 4:
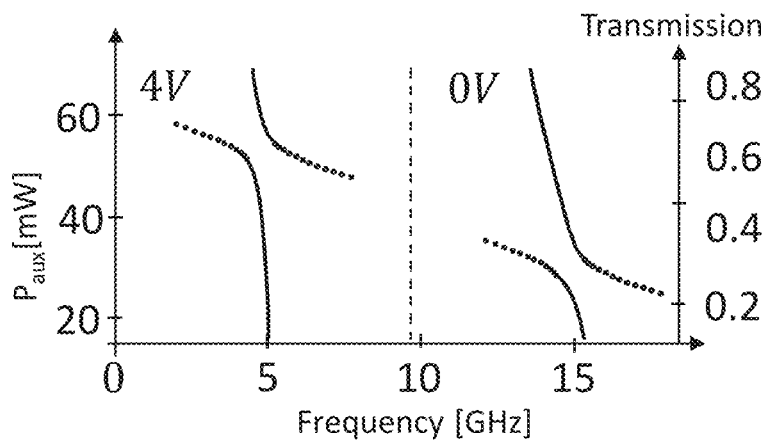
FIG. 4 shows resonance split of the hybridized pumped mode.
Figure 5:
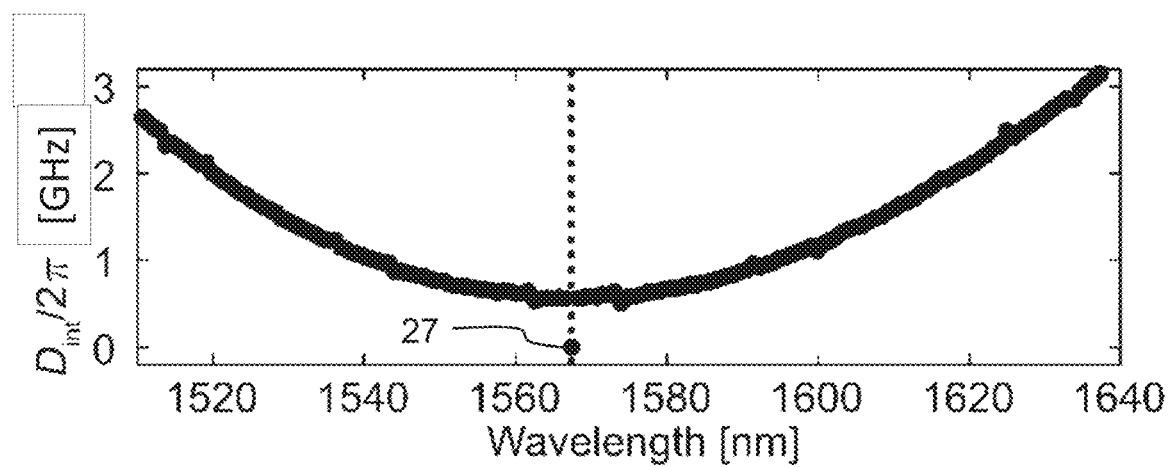
FIG. 5 shows measured integrated dispersion of main resonator.

For our demonstration, we fabricated a device using a subtractive processing method for silicon nitride. The layout was similar to FIG. 3G, with all waveguides having a width of 1800 nm and a height of 740 nm. The main cavity has a radius of 227.82 micrometre [um], while the auxiliary cavity is 23.32 micrometre [um], corresponding to free spectral ranges (FSRs) of 99.72 GHz and 970 GHz. The gap between rings is 500 nm, and 400 nm between the main cavity and the bus waveguide. Both cavities have a heater on top, which allows separate tuning of the resonance locations. FIG. 4 shows mode hybridization near 1566.3 nm. The minimum separation of the resonance split was 1.55 GHz. FIG. 5 shows the integrated dispersion of the main cavity, indicating that the pumped resonance is shifted due to the interaction with the auxiliary cavity. We find a group velocity dispersion coefficient $\beta_2=-89$ ps$^2$/km. The average main cavity intrinsic Q factor $(Q_i)$ is 8 million, and average extrinsic Q factor $(Q_{ex})$ is 3.2 million.

The device was pumped using an external-cavity tunable laser diode. The coupling losses are 3 dB/facet. For the comb initiation we applied 11 mW of on-chip CW power. With the main heater voltage set to 0 V and 1.9 V applied to the heater of the auxiliary cavity, a multi-soliton comb was initiated by tuning the laser into main-cavity resonance from the blue side towards the red. Increasing the auxiliary heater voltage slowly, we were able to reliably reduce the number of solitons until we reached a single soliton state. Then, we fine-tuned the laser frequency and increased the auxiliary heater voltage to 2.3 V. At this point, the auxiliary cavity was inducing a significant phase shift to the CW frequency, allowing a generation of DKS comb with >25% conversion efficiency. In the final step we attenuated the pump power down to 3.9 mW, reaching a DKS state with 52% conversion efficiency, and displayed in FIG. 6A. The conversion efficiency is calculated as the ratio of the comb power (excluding the pump line) to the pump power. We also measured the beat note from the electro-optic down-converted repetition rate, indicating a coherent and stable waveform.

The findings can be replicated by simulation. The simulation considers a main cavity with $Q_i=10$ million and $Q_{ex}=2.5$ million, and an auxiliary resonance with $Q_i=1.2$ million and $Q_{ex}=50$ million. The CW frequency is 267 MHz red detuned from the cold main resonance. The auxiliary resonance is detuned 1.876 GHz towards the blue side of the pump resonance. The nonlinear Kerr parameter is derived from a mode-solver as $\gamma=0.9$ (W·m)$^{-1}$. The input power, GVD coefficient and FSR values are identical to the measured parameters. The results are displayed in FIG. 6A, in outstanding agreement with the measured spectrum. An inset in the figure shows the simulated DKS circulating in the main cavity.

FIG. 4 shows a measurement of the resonance split of the hybridized pumped mode in the main cavity output as a function of auxiliary heater voltage when either 0 V or 4 V are applied to the heater of the main cavity.

FIG. 5 shows measured integrated dispersion of main cavity (blue) with second order fit (red). The dashed line indicates the location of the pumped resonance. The frequency shift is clearly visible in the integrated dispersion.

Figure 6A:
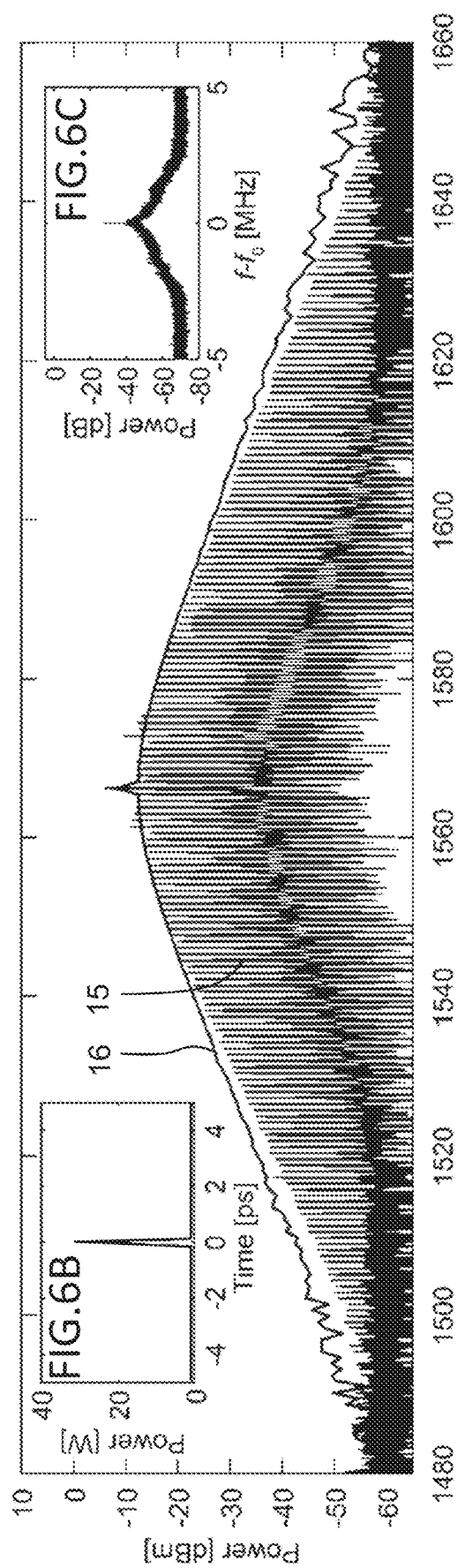

FIG. 6A. Measured (red) and simulated (blue) spectrum coupled from the main cavity to the bus waveguide. FIG. 6B shows the simulated temporal waveform of the main cavity, and FIG. 6C shows a measurement of the downconverted repetition rate beat note (RBW=100 Hz).

Figure 7A:
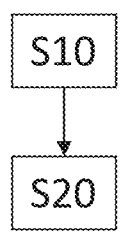
FIG. 7A-B shows the main steps of the methods of the present disclosure.

The disclosure also relates to a method for operating the optical resonator frequency comb according to the disclosure. The basic steps of the method is described below with reference to FIG. 7A. The method comprises a first step S10 of providing a continuous wave (cw) laser, a main optical resonator being made of a resonator material having a third order nonlinearity and an anomalous resonator dispersion, and an auxiliary optical element. The method further comprises a second step S20 of feeding cw laser light from the cw laser into an optical waveguide, which is coupled with the main optical resonator and forming a single dissipative soliton circulating in the main optical resonator corresponding to the generation of a frequency comb, while the auxiliary optical element induces a phase shift to a frequency comb component at the cw laser frequency to enhance the conversion efficiency of a generated frequency comb. Stated differently, the auxiliary optical element may be configured to induce a frequency shift to a longitudinal frequency mode of the main optical resonator associated with the cw laser frequency, thereby enhancing the conversion efficiency of a generated frequency comb.

Figure 7B:
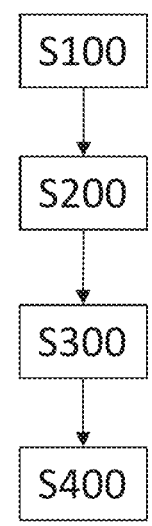

The disclosure also relates to method for initiating the optical resonator frequency comb according to the disclosure, wherein the optical resonator frequency comb has a continuous wave (cw) laser, a main optical resonator being made of a resonator material having a third order nonlinearity and an anomalous resonator dispersion, an auxiliary optical element in form of an auxiliary resonator, and an auxiliary heater (6) for tuning of a resonance frequency of the auxiliary resonator. With reference to FIG. 7B, method comprises a first step S100 of feeding cw laser light into an optical waveguide using the cw laser and controlling operation of the auxiliary heater (6) for providing a multi-soliton comb in the main optical resonator. The method comprises a second step S200 of tuning the cw laser and the auxiliary heater (6) for reducing the number of solitons until a single dissipative soliton circulates in the main optical resonator corresponding to the generation of a frequency comb. Furthermore, the method comprises a third step S300 of increasing the power of the auxiliary heater (6) for inducing a phase shift to a frequency comb component at the cw laser frequency to enhance the conversion efficiency of a generated frequency comb, and thereafter a fourth step S400 attenuating the power of the cw laser light. Stated differently, the method comprises increasing the power of the auxiliary heater for inducing a frequency shift to a longitudinal frequency mode of the main optical resonator, the longitudinal frequency mode being associated with the cw laser frequency, and thereby enhancing the conversion efficiency of a generated frequency comb and thereafter a fourth step S400 attenuating the power of the cw laser light.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

The invention claimed is:

1. An optical resonator frequency comb system, comprising:
    a main optical resonator being made of a resonator material, which has a third order nonlinearity and an anomalous resonator dispersion,
    a continuous wave (cw) laser configured for supplying continuous laser light into an optical waveguide, which is coupled with the main optical resonator,
    wherein the cw laser, the optical waveguide and the main optical resonator are arranged for resonantly coupling the cw laser light into the main optical resonator for forming a single dissipative soliton circulating in the main optical resonator corresponding to the generation of a frequency comb,
    wherein the optical resonator frequency comb further comprises an auxiliary optical element configured to induce a phase shift to a frequency comb component at the cw laser frequency to enhance the conversion efficiency of a generated frequency comb.

2. The optical resonator frequency comb system according to claim 1, wherein the auxiliary optical element is configured to induce a phase shift to only a limited portion of all frequency comb components of the main optical resonator.

3. The optical resonator frequency comb system according to claim 1, wherein the auxiliary optical element is configured to induce a phase shift to at least one, but not all, longitudinal modes of the frequency comb of a main resonator.

4. The optical resonator frequency comb system according to claim 1, wherein the auxiliary optical element is configured to induce a phase shift to not more than 30 longitudinal modes of the frequency comb of a main resonator.

5. The optical resonator frequency comb system according to claim 1, wherein the auxiliary optical element is configured to induce a phase shift to only one longitudinal mode of the frequency comb of a main resonator.

6. The optical resonator frequency comb system according to claim 1, wherein the main optical resonator has a first free spectral range (FSR), wherein the auxiliary optical element is an auxiliary optical resonator having a second free spectral range (FSR) and being positioned adjacent to the main optical resonator for being linearly coupled with the main optical resonator during operation of the optical resonator frequency comb, wherein the second free spectral range is at least three times larger than the first free spectral range.

7. The optical resonator frequency comb system according to claim 6, wherein the main and auxiliary resonators have a mutual linear coupling during operation of the optical resonator frequency comb, such that the cw laser light being fed into the optical waveguide is resonant in both the main and auxiliary resonators.

8. The optical resonator frequency comb system according to claim 6,
    wherein the auxiliary optical resonator being made of a resonator material, which has a third order nonlinearity and an anomalous resonator dispersion, or
    wherein the auxiliary optical resonator being made of a resonator material having a normal resonator dispersion.

9. The optical resonator frequency comb system according to claim 6,
    wherein at least the auxiliary resonator is provided with an auxiliary heater for enabling tuning of a resonance frequency of at least the auxiliary resonator, or
    wherein each of the main and auxiliary resonators is provided with a separate heater for enabling individual and separate tuning of the resonance frequency of main and auxiliary resonators.

10. The optical resonator frequency comb system according to claim 6, wherein the auxiliary resonator is configured to be tuned to induce a phase shift to the pump frequency such that the cw laser is enabled to operate close to a resonance frequency of a main resonator.

11. The optical resonator frequency comb system according to claim 1, wherein the auxiliary optical element is an auxiliary optical resonator being positioned adjacent to the main optical resonator for being linearly coupled with the main optical resonator during operation of the optical resonator frequency comb, wherein the main optical resonator has an annular form with a first diameter (D1) and an auxiliary optical resonator has an annular form with a second diameter (D2), wherein the first diameter is at least three times larger than the second diameter.

12. The optical resonator frequency comb system according to claim 1, wherein the frequency comb includes a single continuous wave (cw) laser for powering a main resonator with laser light.

13. The optical resonator frequency comb system according to claim 1, wherein the auxiliary optical element is configured to induce a phase shift to not more than 10 longitudinal modes of the frequency comb of a main resonator.

14. The optical resonator frequency comb system according to claim 1, wherein the auxiliary optical element is configured to induce a phase shift to not more than 3 longitudinal modes of the frequency comb of a main resonator.

15. The optical resonator frequency comb system according to claim 1, wherein the main optical resonator has a first free spectral range (FSR), wherein the auxiliary optical element is an auxiliary optical resonator having a second free spectral range (FSR) and being positioned adjacent to the main optical resonator for being linearly coupled with the main optical resonator during operation of the optical resonator frequency comb, wherein the second free spectral range is at least six times larger, than the first free spectral range.

16. The optical resonator frequency comb system according to claim 1, wherein the main optical resonator has a first free spectral range (FSR), wherein the auxiliary optical element is an auxiliary optical resonator having a second free spectral range (FSR) and being positioned adjacent to the main optical resonator for being linearly coupled with the main optical resonator during operation of the optical resonator frequency comb, wherein the second free spectral range is at least nine times larger, than the first free spectral range.

17. The optical resonator frequency comb system according to claim 1, wherein the auxiliary optical element is an auxiliary optical resonator being positioned adjacent to the main optical resonator for being linearly coupled with the main optical resonator during operation of the optical resonator frequency comb, wherein the main optical resonator has an annular form with a first diameter (D1) and an auxiliary optical resonator has an annular form with a second diameter (D2), wherein the first diameter is at least six times larger than the second diameter.

18. The optical resonator frequency comb system according to claim 1, wherein the auxiliary optical element is an auxiliary optical resonator being positioned adjacent to the main optical resonator for being linearly coupled with the main optical resonator during operation of the optical resonator frequency comb, wherein the main optical resonator has an annular form with a first diameter (D1) and an auxiliary optical resonator has an annular form with a second diameter (D2), wherein the first diameter is at least nine times larger than the second diameter.

19. A method for operating an optical resonator frequency comb system, comprising:

providing a continuous wave (cw) laser, a main optical resonator being made of a resonator material having a third order nonlinearity and an anomalous resonator dispersion, and an auxiliary optical element, feeding cw laser light from the cw laser into an optical waveguide, which is coupled with the main optical resonator and forming a single dissipative soliton circulating in the main optical resonator corresponding to the generation of a frequency comb, while the auxiliary optical element induces a phase shift to a frequency comb component at the cw laser frequency to enhance the conversion efficiency of a generated frequency comb.

20. A method for initiating an optical resonator frequency comb system having a continuous wave (cw) laser, a main optical resonator being made of a resonator material having a third order nonlinearity and an anomalous resonator dispersion, an auxiliary optical element in form of an auxiliary resonator, and an auxiliary heater for tuning of a resonance frequency of the auxiliary resonator, the method comprises:

feeding cw laser light into an optical waveguide using the cw laser and controlling operation of the auxiliary heater for providing a multi-soliton comb in the main optical resonator, tuning the cw laser and the auxiliary heater for reducing the number of solitons until a single dissipative soliton circulates in the main optical resonator corresponding to the generation of a frequency comb, increasing the power of the auxiliary heater for increasing a phase shift to a frequency comb component at the cw laser frequency to enhance the conversion efficiency of a generated frequency comb, and thereafter attenuating the power of the cw laser light.

* * * * *